Jan. 30, 1962   J. M. MORGAN, JR., ET AL   3,019,377
HAND SERVO CONTROL SYSTEM
Filed April 16, 1958
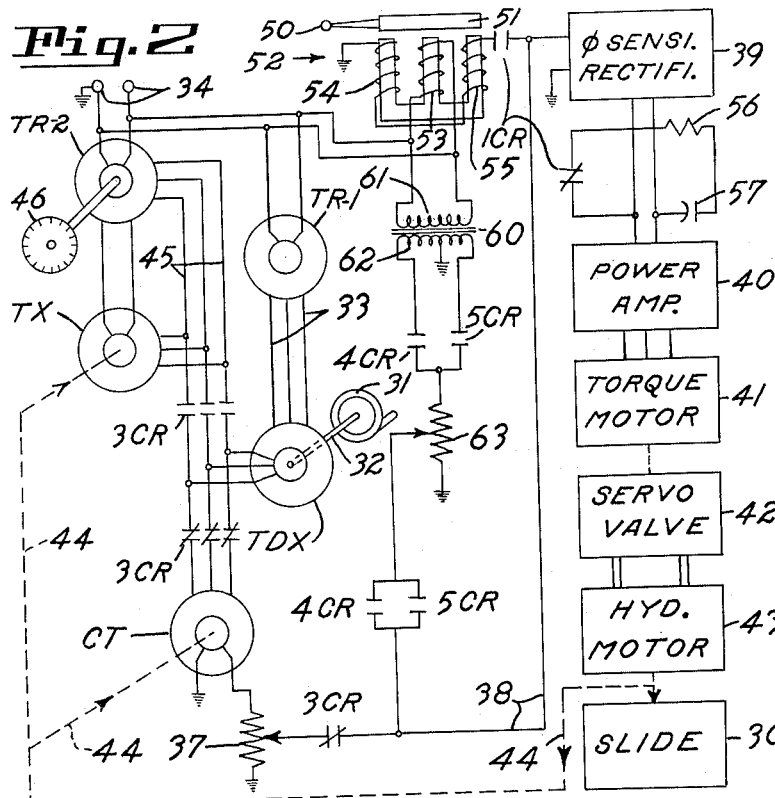
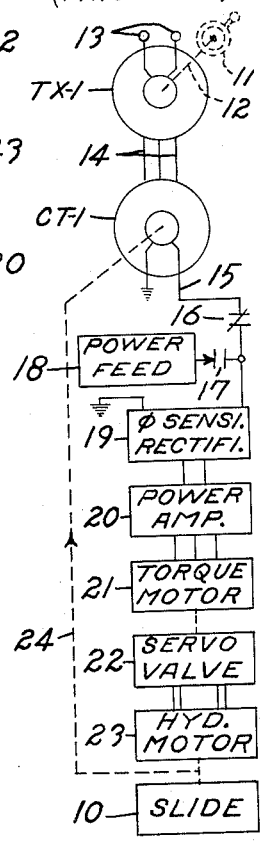
INVENTORS.
JOHN M. MORGAN, JR.
HUBERT K. BROWN.
JOSEPH A. RAVE, JR.
By Howard I. Keiser
& John F. Verhoeven
ATTORNEYS.

United States Patent Office 3,019,377
Patented Jan. 30, 1962

3,019,377
HAND SERVO CONTROL SYSTEM
John M. Morgan, Jr., Montgomery, and Hubert K. Brown and Joseph A. Rave, Jr., Cincinnati, Ohio, assignors to The Cincinnati Milling Machine Co., Cincinnati, Ohio, a corporation of Ohio
Filed Apr. 16, 1958, Ser. No. 728,819
6 Claims. (Cl. 318—24)

This invention relates to a system for controlling the movement of a displaceable element such as a machine tool slide, and more particularly, to a hand servo control for the element or slide which may be selectively disabled during the movement of the element under the control of an independent signal source and reenabled at the conclusion of such an operation to again place the element under the control of a handwheel or similar manipulable element.

One difficulty which has been encountered in the past with systems of this nature is that the transmitter synchro driven by the handwheel gets out of step with the control transformer during those operations in which the element is moved under the control of the independent signal source with the handwheel synchro disconnected from the system. Hence, when the handwheel synchro is reconnected into the system at the conclusion of such operation, the slide will "jump" to the position indicated by the setting of the handwheel. This jump may be as much as the distance represented by 180 degrees of synchro rotation, i.e., one-half the distance moved by the machine element on each revolution of the transmitter synchro. This jump is objectionable and may result in dame to the workpiece or cutter if the cutter is in contact therewith at the time the jump occurs.

The present invention has for its object the elimination of this jump of the machine tool slide when the handwheel is reengaged at the conclusion of a tracing, power feeding, or rapid traverse operation, and embodies means for keeping the handwheel synchro in step with the control transformer during such operations so that when the handwheel is reengaged no jump of the slide will occur.

Accordingly, it is an object of the present invention to provide a hand servo control system for a machine tool slide which may be disengaged when the slide is being operated under the control of an independent signal source such as that provided by a tracer or power feed mechanism and reengaged in any position of the slide without producing any undesirable movement of the slide as a result of such reengagement.

Another object of the invention is to provide means for keeping the handwheel synchro of a hand servo control system for a slide in synchronism with the control transformer of the system during the time that the handwheel synchro is disconnected from the servo amplifier and the slide is being operated under the control of an independent signal source in order that no jump will occur when the handwheel synchro is again connected with the servo amplifier.

A further object of the invention is to incorporate in a hand servo control system for a machine tool slide a synchronizing synchro for maintaining the handwheel synchro in step with the control transformer when the slide is being operated independently of the hand servo control apparatus.

A further object of the invention is to provide means for delaying the reengagement of the handwheel for a predetermined time interval so as to enable the rate of stopping of the slide to be controlled as desired before the slide is returned to handwheel control.

A further object of the invention is to provide means to prevent coasting of the synchronizing synchro after hand servo control of the slide is reestablished to thereby prevent consequent coasting of the slide.

With these and other objects in view, which will become apparent from the following description, the invention includes certain novel features of construction and combinations of parts, the principal elements of which are set forth in the appended claims and a preferred form or embodiment of which will hereinafter be described with reference to the drawings which accompany and form a part of this specification.

In the drawings:

FIG. 1 is a schematic view of a conventional type of hand servo control system for machine tool slides.

FIG. 2 is a schematic view of a hand servo control system incorporaating the present invention.

FIG. 3 is an electrical wiring diagram for the system shown in FIG. 2.

In the following description of the invention it will be understood that similar reference characters designate similar or identical elements throughout the specification and throughout the different views of the drawings.

A conventional form of hand servo control system is shown in FIG. 1 of the drawings wherein a slide 10 is arranged for operation by a servo-mechanism under the control of a hand wheel 11. It is well known that with this arrangement the slide will follow movements of the handwheel in either direction. The handwheel 11 is mounted upon or otherwise connected to the shaft 12 of the rotor of a synchro transmitter TX-1, the rotor windings of which are connected to a suitable source of alternating current as indicated by the terminals 13. The stator windings of the synchro transmitter are connected by conductors 14 to the stator windings of a synchro control transformer CT-1. The rotor windings of the control transformer provide actuating signals for the servomechanism of the system. The servomechanism is shown in block diagram form in the drawings and includes a servoamplifier comprised of elements 19, 20, 21 and 22, and a hydraulic servomotor 23. The servoamplifier, as herein indicated, is comprised of electronic, electromagnetic, and hydraulic amplifier components which determine the direction and rate of rotation of the servomotor 23 in accordance with the phase and amplitude of the actuating signal applied thereto. As shown in FIG. 1, the actuating signal from the control transformer is applied to the servoamplifier through a conductor 15 and the normally closed contacts 16 of a control relay (not shown). The relay has a second pair of contacts 17 which are inserted between a power feed signal source 18 and the conductor 15. When power feeding movement of the slide 10 is desired instead of hand servo control thereof, the relay is energized, thereby closing the normally open contacts 17 and opening the normally closed contacts 16. As shown herein, the actuating signal either from the control transformer or from the power feed source 18 is fed into a phase sensitive rectifier 19 which senses the phase of the signal voltage and rectifies it to provide a plus or minus D.C. signal to the power amplifier 20. The amplified D.C. signal actuates a torque motor 21 which in turn operates a hydraulic servo valve 22 which controls the operation of the hydraulic motor 23. This is the servomotor of the system, and it is connected by a suitable drive mechanism with the slide 10 to move the same in accordance with the actuating signal provided to the servo amplifier. The rotor of the control transformer CT-1 is arranged to be driven in synchronism with the slide by a mechanical driving connection 24, thereby providing a mechanical feed back from the slide to the control transformer to provide a closed loop type of hand servo control system.

As long as the control relay is deenergized so as to connect the handwheel control with the slide, the slide will accurately follow the movement of the handwheel and perfect synchronism will be maintained between these two elements. However, when the control relay is energized to disconnect the handwheel control and connect the power feed source to the servo amplifier, the handwheel will remain at rest during movement of the slide 10 under control of the signal from the power feed source. Since the slide drives the rotor of the control transformer through the mechanical feed back connection 24, the rotor of the control transformer will likewise move relative to the handwheel. Hence, when the control relay is deenergized to again connect the signal from the control transformer to the servo amplifier, the discrepancy in the position of the two rotors, i.e., the rotor of the synchro transmitter and the rotor of the control transformer will cause an error signal to be transmitted to the servo amplifier thereby driving the slide in a direction to bring the control transformer back into correspondence with the synchro transmitter. This "jump" of the slide is undesirable since in a machine tool organization it may cause the cutter to move into the workpiece with consequent damage thereto.

To overcome this difficulty, means has been provided in the novel hand servo control system shown in FIG. 2 for maintaining synchronism between the handwheel synchro and the control transformer when the handwheel is disconnected from the slide so that when it is reconnected after an independent movement of the slide, no jump will take place. As shown in FIG. 2, a slide 30 is adapted to be positioned under the control of a handwheel 31 which is connected to a shaft 32 of a synchro transmitter TDX, which is preferably a transmitter of the differential type. The stator windings of this synchro are connected to the stator windings of a synchronizing or "dummy" synchro receiver TR-1 by conductors 33. There is no mechanical connection of any sort to the rotor of the synchro TR-1, this synchro having no function except to provide a reference for the synchro differential transmitter TDX. The rotor windings of the dummy synchro are connected to an A.C. source represented by terminals 34. This source also furnishes excitation to the rotors of a synchro receiver TR-2 and a synchro transmitter TX.

The rotor windings of the synchro differential transmitter TDX are connected through the normally closed contacts of a relay 3CR to the stator windings of a synchro control transformer CT. The signal from the control transformer is applied to a potentiometer 37 and a portion of this signal is tapped off by the slider and transmitted via the normally closed contacts of the relay 3CR and a conductor 38 to the servomechanism for driving the slide 30 which includes a servoamplifier comprised of elements 39, 40, 41 and 42, and a hydraulic servomotor 43. Hence, when the dummy synchro TR-1 is at rest and the handwheel 31 is rotated, the control transformer will produce an actuating signal which is transmitted by the conductor 38 to the input of a phase-sensitive rectifier 39 which delivers a plus or minus D.C. signal, depending upon the phase of the actuating signal, to a power amplifier 40. The signal is then amplified and applied to a torque motor 41 which drives a servo valve 42, which, in turn, controls the operation of the hydraulic servomotor 43. This motor drives the slide 30 in one direction or the other depending upon the phase of the actuating signal. A mechanical driving connection 44 is provided between the output shaft of motor 43 and the rotor of control transformer CT so as to provide a closed loop servo system. As shown herein, the rotor of the synchro transmitter TX is also driven by the mechanical feedback train 44 so as to maintain synchronism between the rotors of synchros TX and CT. The stator windings of the transmitter synchro TX are connected by conductors 45 with the stator windings of the synchro receiver TR-2 so that a dial 46 driven by the rotor of the latter synchro will follow the movements of the slide and provide a visual indication of its position at all times.

When it is desired to utilize tracer control of the slide 30, the relay 3CR is energized, thereby removing the control transformer CT from the circuit and at the same time connecting the synchro differential transmitter TDX to the synchro transmitter TX through the normally open contacts of relay 3CR. As shown in FIG. 2, a tracer stylus 50 is connected to an armature 51 of a differential transformer 52 having a primary winding 53 which is energized from the A.C. source 34. The transformer is also provided with secondary windings 54 and 55 which are connected in phase opposition and have their output connected to the conductor 38 through the normally open contacts of a relay 1CR. When relay 3CR is energized, the relay 1CR is also energized so that the secondary windings of the tracer pickup are connected to the input of the servo amplifier while the control transformer is disconnected therefrom. Consequently, the slide 30 which may, for example, carry the tracer and move it in relation to a pattern, will be controlled by a signal from the tracer and thereby be caused to follow the contour of the pattern as it is moved thereacross by suitable movement of another slide (not shown).

As the slide 30 moves during the tracing of the pattern, this movement is transmitted by the driving connection 44 to the rotor of the synchro transmitter TX which in turn drives the rotor of the dummy synchro TR-1 through the synchro differential transmitter TDX. In this way, the dummy is kept in step or synchronism with the slide during tracing operations. The control transformer CT is also kept in synchronism with the slide by the driving connection 44. Inadvertent movement of the hand wheel during tracing or power feeding operations will have no effect upon the synchronism between the dummy synchro and the control transformer since such movement of the synchro differential transmitter TDX will merely advance or retard the dummy synchro by an equal amount so that any movement of the rotor of synchro TDX is compensated for by the change in position of the rotor of the dummy synchro. Furthermore, it is to be noted that with this arrangement, movement of the handwheel while the slide is being moved under tracer or power feed control, will have no effect on the movement of the slide.

When the tracing operation is concluded, the relay 1CR is deenergized, and, after a predetermined time delay, the relay 3CR is also deenergized. When the relay 1CR is deenergized, the normally open contacts of this relay in FIG. 2 are opened, and the signal from the tracer is removed from the phase-sensitive amplifier so that the slide is stopped. This time delay in the operation of the two relays is provided so that the slide will have sufficient time to come to a full stop before the handwheel is again connected. This is necessary since, if the slide were still moving at this time, the dummy would be rotating and, due to its own inertia, would continue to rotate and drive the slide after the handwheel was connected. This would cause the slide to coast until the dummy stopped rotating which would be undesirable. Hence, provision must be made for stopping the slide, and thereby also the dummy, before the handwheel is connected so that the dummy will provide a stationary reference for the handwheel synchro when it is again connected to the slide through the control transformer CT. The time delay also provides an opportunity for controlling the stopping of the slide at a desired rate before it is returned to handwheel control.

Power feeding of the slide in either direction may be effected by energizing either a relay 4CR for movement of the slide to the left, or a relay 5CR for movement of the slide to the right. Energizing potential for power feeding of the slide in either direction is provided by a transformer 60 having a primary winding 61 connected to the A.C. source 34. The secondary winding 62 of the transformer is provided with a grounded center-tap while the ends of the secondary winding are connected by normally open contacts of relays 4CR and 5CR with one end of a potentiometer 63. The opposite end of this potentiometer is grounded and the slider thereof is arranged to be selectively connected by a second pair of normally open contacts 4CR and 5CR with the input conductor 38 for the servo amplifier. The potentiometer 63 provides a means for controlling the rate of power feeding movement of the slides while the contacts 4CR and 5CR provide means for controlling the direction of movement of the slide. When either relay 4CR or 5CR is energized to provide a power feed signal to the servo amplifier, the relay 3CR is simultaneously energized to disconnect the handwheel. As in tracing operations, the control transformer and the synchro transmitter TX are driven by the slide in synchronism therewith. The dummy synchro TR–1 will also be driven in synchronism with the slide by the synchro transmitter TX. Hence, the dummy synchro and the control transformer are kept in step with one another so that there will be no "jump" when the handwheel is again connected.

When it is desired to terminate the power feed movement of the slide, the contacts 4CR or 5CR will be opened and the power feed signal will be removed from the servo amplifier. In power feeding operations, relay 1CR is deenergized and a resistance-capacitance network comprised of a resistor 56 and a capacitor 57 is connected across the leads connecting the phase-sensitive rectifier 39 with the power amplifier 40. This network comprises an integration circuit and is effective, through the normally closed contacts of relay 1CR, to equalize the potential across the leads within a predetermined time after an input signal has been removed from the input of the phase-sensitive rectifier. During tracing operations, however, this network is rendered ineffective by the 1CR contacts since it would otherwise introduce an undesirable time constant in the servo amplifier and thereby prevent accurate tracing of the pattern outline.

In both power feed and tracing operations, the dial 46 is operative so as to follow the movements of the slide and thereby at all times provide an accurate indication of the position of the slide.

The electrical control circuit for the system shown in FIG. 2 is illustrated in FIG. 3 of the drawing. The control relays shown at the right hand side of the diagram are adapted to be energized from an A.C. source, indicated by terminals 69, by means of conductors 71 and 72 connected to the terminals. Assuming the lines 71 and 72 to be energized, a tracing operation may be initiated by depression of the "Trace" push button 73. The control relay 1CR will thereby be energized through the normally closed contacts of a "Stop" push button 74 and the normally closed contacts of relays 4CR and 5CR. When this relay is energized, its normally open contacts 1CR in line 4 will be closed, thereby latching in the relay across the push button 73 so that the relay will remain energized when this push button is released. Energization of relay 1CR will also cause the contacts 1CR in line 6 to close, thereby energizing a time delay relay 2TR whereupon the contacts of this relay in line 2 will be instantly closed. This energizes a relay 3CR and causes the contacts of this relay shown in FIG. 2 to be operated to disconnect the handwheel from the slide and to connect the servo amplifier to the tracer. To stop the tracing operation, the "Stop" push button 74 is depressed, thereby deenergizing relay 1CR and dropping out the time delay relay 2TR. The contacts 2TR in line 2 will then open after a predetermined time delay and return the slide to handwheel control after it has been brought to a full stop. Hence, the dummy synchro TR–1 will be brought to a halt before the handwheel is reengaged. Continued spinning of the dummy synchro after the handwheel is reengaged is thus prevented, and, as a result uncontrolled coasting of the slide 30 is avoided.

To initiate a power feed operation, either a "Power Left" or a "Power Right" push button may be depressed. When the "Power Left" push button 75 is depressed, control relay 4CR is energized through the normally closed contacts of a "Stop" push button 76 and the normally closed contacts of relays 5CR and 1CR shown in line 8. Closure of the contacts of relay 4CR in line 5 causes the time delay relay 2TR to be energized, thereby energizing relay 3CR so as to disconnect the handwheel. At the same time, the two sets of normally open contacts 4CR shown in FIG. 2 will be closed to provide a power feed signal to the servo amplifier. When power feeding movement of the slide to the left is to be terminated, the "Stop" push button 76 is depressed thereby deenergizing relay 4CR which drops out time delay relay 2TR and causes the contacts of this relay in line 2 to time open. Hence, at a predetermined time after the slide has been brought to a stop under the control of the resistance-capacitance network 56, 57, the handwheel will be reconnected and placed in control of the slide.

Similarly, when the "Power Right" push button 77 is depressed, relay 5CR is energized through the normally closed contacts of a "Stop" push button 78 and the normally closed contacts of relays 4CR and 1CR shown in line 10. Again, relays 2TR and 3CR will be energized to disconnect the handwheel from the slide and connect a power feed rate signal to the servo amplifier through the closure of the contacts 5CR shown in FIG. 2. When the power feed movement of the slide to the right is terminated by depression of the "Stop" push button 78, the power feed rate signal will be removed from the servo amplifier and the slide brought to a halt through the operation of the resistor-capacitance network. A predetermined time later, the relay 3CR will be deenergized to thereby again connect the handwheel to the servo amplifier for control of the slide 30.

While we have shown and described one embodiment of our invention herein, it is to be understood that it is capable of being carried out in several different ways. Changes, therefore, may be made in the construction and arrangement of our hand servo control system without departing from the spirit and scope of the invention as expressed in the appended claims which are intended to encompass the patentable novelty in our invention as broadly as is possible in view of the prior art.

We claim:

1. In a hand servo control apparatus for a machine tool having a slide and means for driving the slide in either direction including a servomotor and a servo amplifier for operating the servomotor in accordance with the phase and amplitude of an actuating signal, the invention comprising a synchro differential transmitter, a handwheel for operating the synchro differential transmitter, a normally quiescent dummy synchro receiver having its stator windings connected to the stator windings of said synchro differential transmitter, an A.C. source for energizing the rotor windings of said dummy synchro, a control transformer having its stator windings connected to the rotor windings of said synchro differential transmitter and its rotor windings connected to the input of said servo amplifier to provide an actuating signal for said servo amplifier, means for driving said control transformer in synchronism with said slide to provide mechanical feedback to said control transformer, an independent source of actuating signal for said servo amplifier, means for disconnecting said control transformer from said servo amplifier and connecting said independent source to said servo amplifier so as to drive said slide in accordance with the signal from the said independent source, and means for driving said dummy synchro in synchronism with said slide when said control transformer is disconnected, thereby to maintain said synchro differential transmitter in synchronism with said control transformer during movement of said slide under control of the signal from said independent source so as to prevent jump of the slide when said control transformer is again connected to said servo amplifier.

2. The hand servo control apparatus of claim 1 wherein said last-recited means includes a synchro transmitter driven in synchronism with said slide, and means for connecting the stator windings of said synchro transmitter to the rotor windings of said synchro differential transmitter when said control transformer is disconnected from said servo amplifier so as to cause the rotor of said dummy synchro to be driven in synchronism with said slide.

3. The hand servo control apparatus of claim 2 including means for delaying the disconnection of said synchro transmitter from said synchro differential transmitter for a predetermined time after the servo amplifier is disconnected from said independent source so as to cause the dummy synchro and said slide to be brought to rest before said control transformer is again connected to said servo-amplifier.

4. The hand servo control apparatus of claim 3 including an integration circuit in said servo amplifier for controlling the deceleration of said slide when the servo amplifier is disconnected from said independent source.

5. In a hand servo control apparatus for a machine tool having a slide and means for driving the slide in either direction including a servomotor and a servo amplifier for operating the servomotor in accordance with the phase and amplitude of an actuating signal, the invention comprising a synchro transmitter, a handwheel for operating the synchro transmitter, a control transformer connected to said synchro transmitter and driven in synchronism with said slide for providing an actuating signal to said servo amplifier when said synchro transmitter is operated by said handwheel, an independent source of actuating signal for said servo amplifier, means for disconnecting said control transformer from said servo amplifier and connecting said independent source to said servo amplifier so as to drive said slide in accordance with the actuating signal from said source, and means for maintaining said synchro transmitter in synchronism with said control transformer during movement of said slide under the control of the signal from said independent source so as to prevent jump of the slide when said control transformer is again connected to said servo amplifier, said last-named means including a second synchro transmitter driven in synchronism with said slide, and a synchro receiver connected with said handwheel operated synchro and adapted to be driven by said second synchro transmitter when the handwheel control is disabled for maintaining the handwheel operated synchro in synchronism with said control transformer during movement of the slide under control of a signal from said independent source.

6. The hand servo control apparatus of claim 5 including a second synchro receiver connected with said second synchro transmitter, and a dial driven by said second synchro receiver for at all times indicating the position of said slide.

References Cited in the file of this patent

UNITED STATES PATENTS

| | | |
|---|---|---|
| 2,619,733 | Horton et al. | Dec. 2, 1952 |
| 2,670,456 | Naylor et al. | Feb. 23, 1954 |
| 2,734,155 | Schuck | Feb. 7, 1956 |